May 7, 1935.  L. H. THOEN  2,000,364
LAND VEHICLE CONSTRUCTION
Filed Aug. 25, 1933
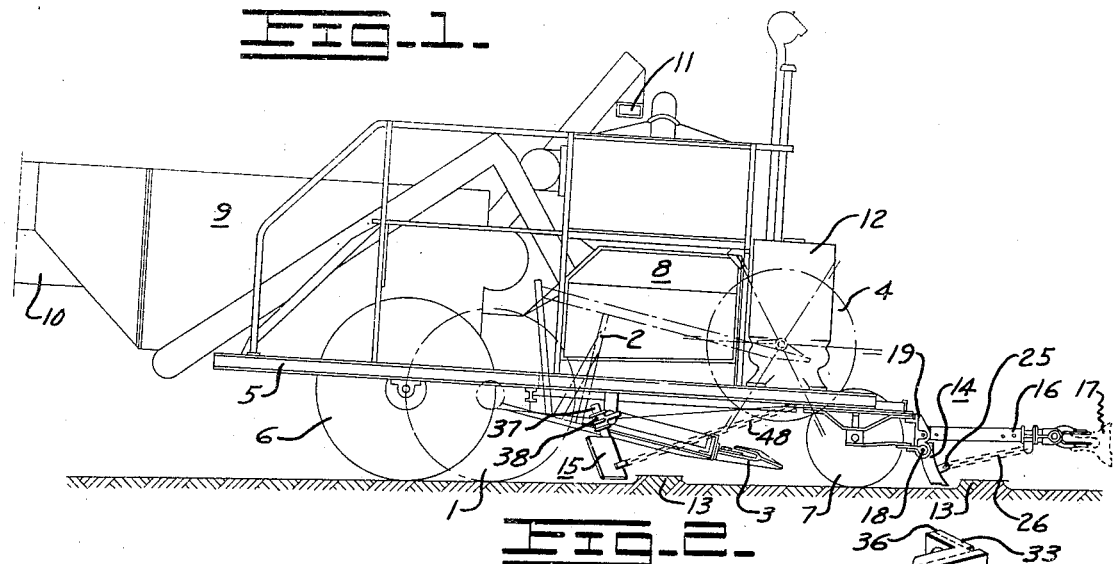
Fig. 1.
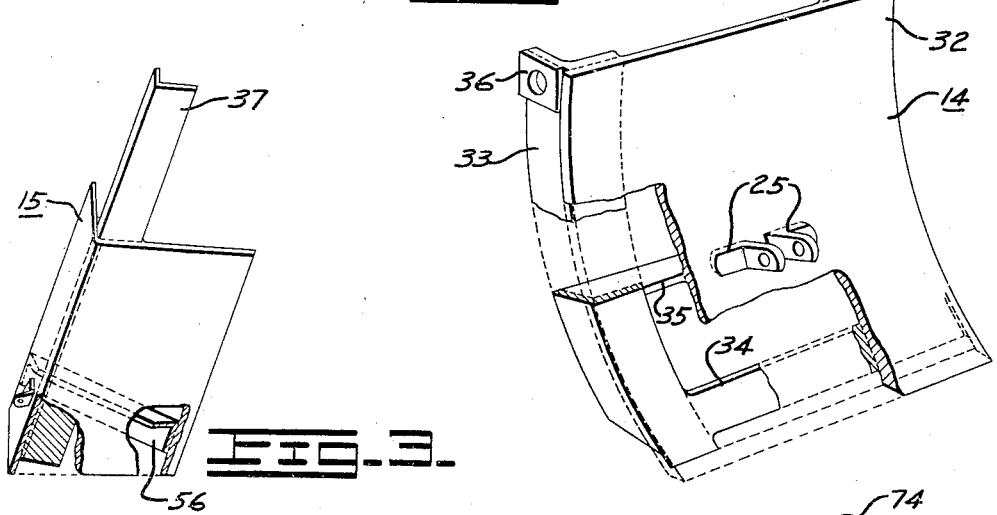
Fig. 2.
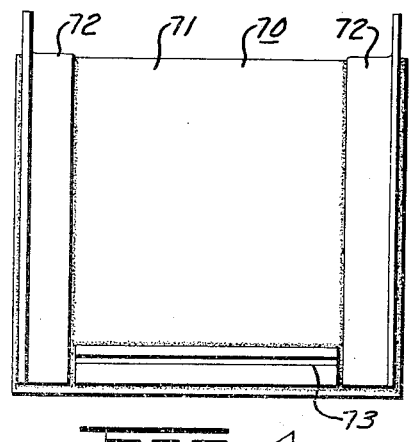
Fig. 3.
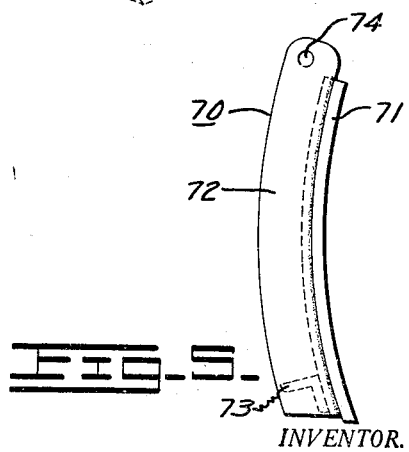
Fig. 4.
Fig. 5.
INVENTOR.
LOWELL H. THOEN
BY
ATTORNEY.

Patented May 7, 1935

2,000,364

UNITED STATES PATENT OFFICE 2,000,364

LAND VEHICLE CONSTRUCTION

Lowell H. Thoen, Stockton, Calif., assignor to Caterpillar Tractor Co., San Leandro, Calif., a corporation of California Application August 25, 1933, Serial No. 686,806

2 Claims. (Cl. 280—160)

This invention relates to improvements in land vehicles and particularly to those which are used on rough ground; and the objects of my improvements are: to provide a means on a land vehicle for smoothing the ground on which the vehicle is to bear; to provide a check breaker construction which is efficient in operation and which can be economically manufactured. These objects are attained by the mechanism illustrated in the accompanying drawing.

Fig. 1 is a right side elevation of a machine embodying the invention, disclosing check breakers mounted in front of the wheels of a combined harvester-thresher.

Fig. 2 is a perspective view illustrating the form of check breaker associated with the front wheels in Fig. 1, certain portions thereof being broken away to disclose the construction more clearly.

Fig. 3 is a perspective view illustrating the form of check breaker associated with the rear wheels in Fig. 1, certain portions thereof being broken away to disclose the construction more clearly.

Figs. 4 and 5 illustrate a third form of check breaker.

Fig. 4 is a rear elevation.

Fig. 5 is a side elevation.

The vehicle chosen for illustration is a combined harvester-thresher which is composed of the usual harvesting mechanism suggested in Fig. 1 by supporting means as wheel 1, framework 2 carried thereon and supporting at its leading lower edge sickle bar 3, and by reel 4 which cooperates with sickle bar 3 in placing the cut grain on the draper for delivery into the feeder house 8. From there the grain passes through the thresher and separator 9 from which the straw is delivered at 10 and grain kernels at 11. A power plant 12 is usually provided for driving the working parts of the harvesting and threshing mechanisms. The threshing machine is supported on a main frame 5, having three-point support on rear wheels 6 and front wheel 7 and is provided with a drawbar 16 for connection to a tractor, as at 17. The framework 2 of the harvester is connected to the frame 5 in the usual manner.

The surface of the ground on which machines for this purpose operate is frequently quite uneven, particularly in those localities where irrigation is resorted to, in which case checks 13 are usually formed to retain the water. To harvest grain grown in this manner, the harvesting machine is subjected to severe strain in passing over the uneven ground and check breakers constructed in accordance with the invention are particularly useful under these and similar conditions of operation.

The purpose of the check breaker is to break the check and to otherwise smooth the surface of the ground in advance of the wheel. In practice, these check breakers take different forms and for purposes of illustration, one form 14 is shown associated with front wheel 7. Another form 15 is shown associated with rear wheels 6.

Check breaker 14, as shown in Fig. 1, is pivoted on pivot rod 18 carried in similar brackets 19 on the frame, only one of said brackets being seen in Fig. 1. Brackets 19 also provide the connection from drawbar 16 to the frame of the vehicle. The check breaker is maintained in operative position by chain 26 suitably secured in angle brackets 25 (Figs. 1 and 2) on the check breaker and to the drawbar. By means of chain 26, plate 14 of the check breaker can be adjusted to different positions of inclination with respect to the ground, or swung to a horizontal position when it is not in use. The mounting and adjustment of check breaker 14 is fully described in my co-pending application, Serial No. 485,142, filed September 29, 1930, of which the instant application is a continuation in part.

Fig. 2 illustrates that the blade construction comprises a curved plate 32, reinforced along its vertical edges by angles 33 and along its cutting face by plate 34 and is stiffened across the back, opposite the chain connection, by a rib 35. Increased bearing surfaces at the pivot points is obtained by attaching square plates 36 as shown. The tool is readily fabricted by welding the parts together.

Check breaker 15 (Figs. 1 and 3) is V-shaped, being supported by angle bar 37 which is adapted to be adjustably clamped in bracket 38 which is rotatably supported on the frame of the machine as fully disclosed in my above noted application. Chain 48 provides a connection from check breaker 15 to the frame of the machine to determine its rotated position.

Blade 15 (Fig. 3) is integral with its supporting bar 37, and said blade is formed of a plate bent at substantially a right angle to which is preferably welded angle bar 37. Angle bar 56 is welded across the back of the blade to reinforce it.

Check breaker 70 (Figs. 4 and 5) is similar to the check breaker illustrated in Fig. 2. In this form of check breaker, the blade construction comprises curved plate 71, reinforced along its vertical edges by angles 72 and along its cutting face by angle 73 which provides a stiffening rib.

Angles 72 are apertured adjacent the top as at 74 to provide pivot points for attaching the check breakers to a vehicle. The tool is fabricated by welding the parts together. The above described check breaker construction is particularly adapted for use with vehicles where no angular adjustment thereof with respect to the ground is required. The check breaker is pivotally mounted in a suitable manner on the vehicle which has frame portions positioned behind the check breaker to prevent yielding thereof when an obstruction is encountered. This form of check breaker may be used, for example, in front of the endless tracks of a track-type tractor.

I, therefore, claim as my invention:

1. A check breaker adapted for positioning in front of a ground contacting member of a land vehicle comprising a plate, a reinforcing angle secured to the back of said plate adjacent each of the vertical edges of said plate, another reinforcing angle secured to the back of said plate adjacent the cutting edge thereof, said first-mentioned angles having pivot providing means for pivotally attaching said check breaker to said vehicle.

2. A check breaker adapted for positioning in front of a ground contacting member of a land vehicle comprising a curved plate, a reinforcing angle welded to the back of said plate along each of the vertical edges of said plate, the upper ends of said angles being apertured to provide means for pivotal connection of said plate to said vehicle, and another reinforcing angle welded to the back of said plate along the cutting edge thereof for providing a stiffening rib.

LOWELL H. THOEN.